2,948,551
Patented Aug. 9, 1960

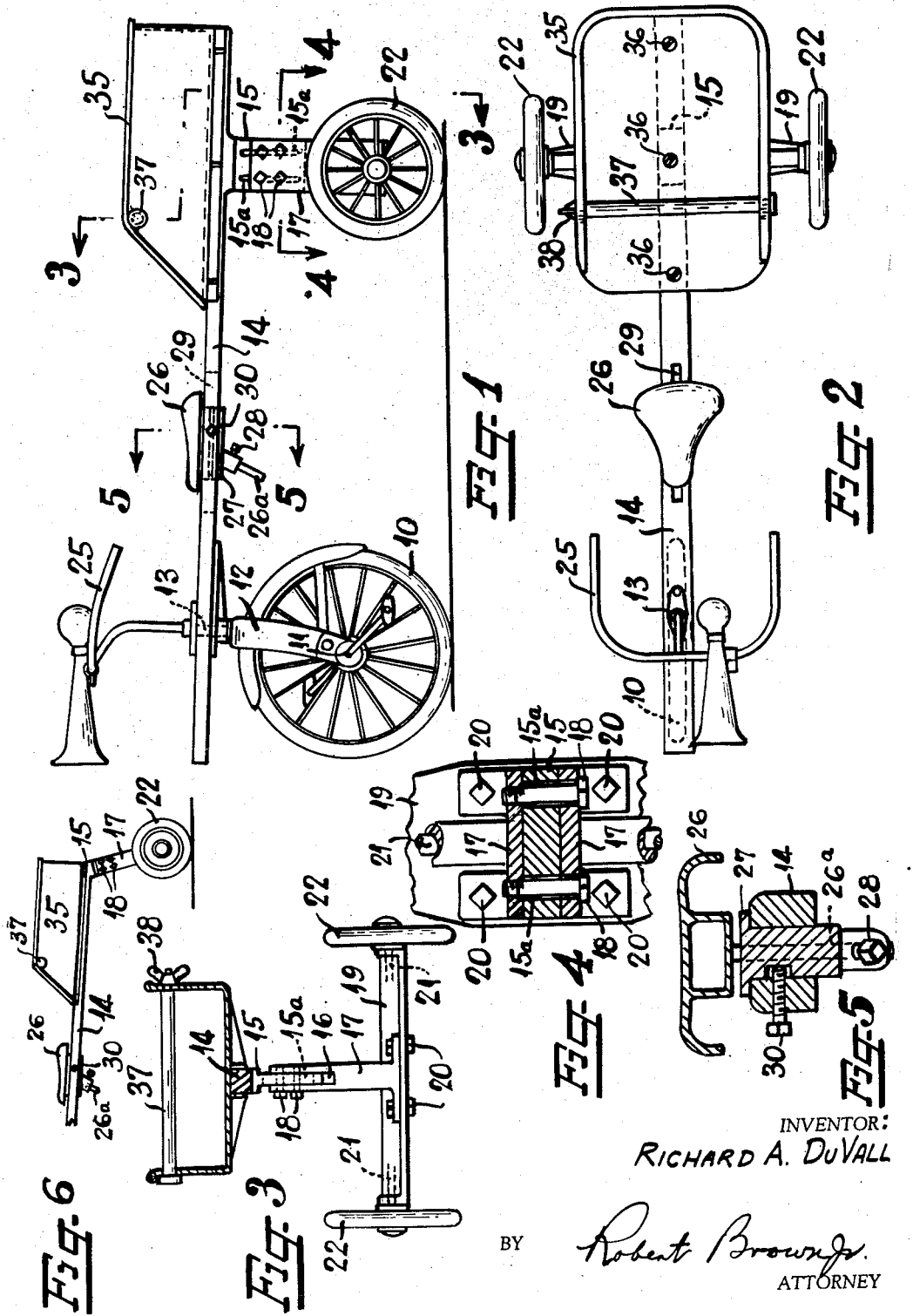

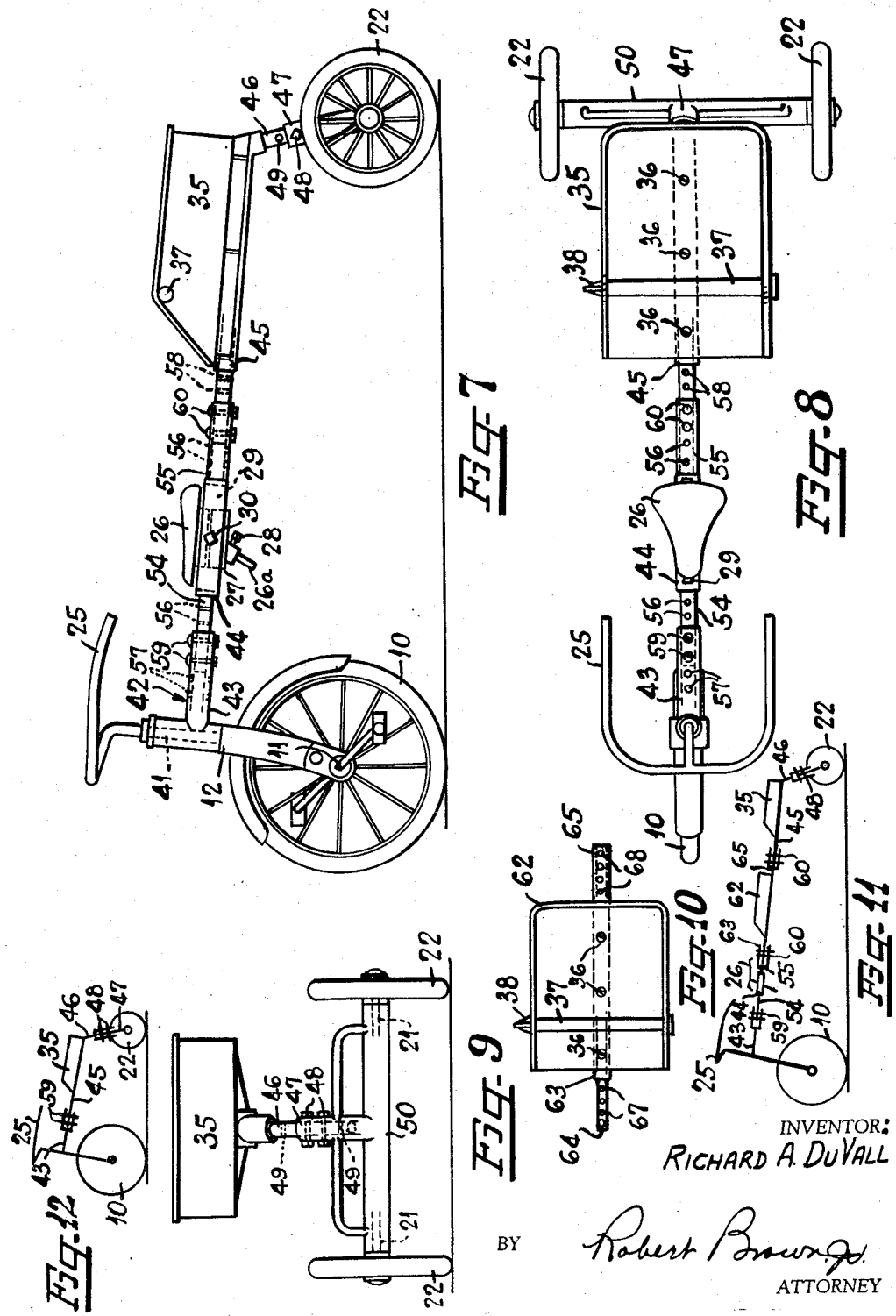

2,948,551
TRICYCLE WITH TANDEM SEATS
Richard A. Du Vall, 2104 Summit, Little Rock, Ark.

Filed Sept. 5, 1958, Ser. No. 759,166

2 Claims. (Cl. 280—202)

This invention relates to a child's toy, and more particularly to a three-wheeled combination vehicle serving the purpose of two tricycles and a wagon, and which affords improved weight distribution, either when loaded or unloaded.

It is an object of this invention to provide a vehicle of the class described, featured by a relatively long wheel base abridged by a specially constructed seat-supporting coupling frame, which frame is arranged so that greater ground clearance will be provided while maintaining a low center of gravity of the assembly.

Another object of the invention is to provide in a tricycle, a coupling frame comprising an elongated seat-supporting straddle beam or bar mounted with proper ground clearance and with its upper surface inclined rearwardly and downwardly to thereby lower the center of gravity of the assembly. Although the inclination of the bar is desirable and necessary to effect a low center of gravity, such inclination should not be so great as to prevent the upper surface of the bar adjacent and between the seats from being utilized to support passengers or objects, particularly while mounting or descending from the seats.

Another object of the invention is to provide means for adjusting the degree of inclination of said straddle bar.

A further object of the invention is to provide an improved type of tandem seat on the straddle beam, which seat is so constructed and arranged that vibration of the vehicle will tend to bounce the cargo deeper into the seat rather than out.

It is a further object of the invention to provide a tricycle having a relatively long, rearwardly extending and downwardly inclined, coupling frame or bar adapted to be straddled by the passengers and upon which a plurality of seats or passengers may be arranged in tandem, thus giving the child operator the sensation of operating a long train.

It is a further object of this invention to provide a tricycle type of vehicle specifically designed for use by children in suburban areas where there are no sidewalks and over rough terrain. To facilitate efficient operation under such conditions it is necessary to equip the vehicle with wheels of relatively large diameter.

It is a further object of this invention to provide means for adjusting the position of at least one of the seats relative to the other along the inclined straddle bar.

It is yet another object of the invention to provide an inclined straddle beam as above described, having the seats mounted thereon entirely between the front and rear axles of the vehicle, thereby placing all possible loads between the wheels and reducing the tendency of the vehicle to overturn.

Some of the objects of the invention having been stated, other objects will appear as the description proceeds when taken in connection with the accompanying drawings, in which:

Figure 1 is an elevational view of my improved child's vehicle;

Figure 2 is a plan view of Figure 1;

Figure 3 is a transverse sectional view taken along line 3—3 in Figure 1;

Figure 4 is a sectional detail view taken along line 4—4 in Figure 1, showing the slant adjusting means for the straddle bar;

Figure 5 is a transverse sectional view taken along line 5—5 in Figure 1, showing means for adjusting the position of the operator's seat horizontally and vertically;

Figure 6 is a fragmentary view embodying a slightly modified form of the invention in which both seats, and all possible loads carried thereby, are located wholly between the front and rear axles of the vehicle;

Figure 7 is an elevational view showing a modified form of the invention wherein means are provided for adjusting the length of the wheel base;

Figure 8 is a plan view of Figure 7;

Figure 9 is an elevational view looking at the right-hand end of Figure 7;

Figure 10 is a plan view showing a spare tandem seat adapted to be used with the vehicle shown in Figures 7, 8 and 9;

Figure 11 is a schematic view showing the tandem seat illustrated in Figure 10 incorporated in the structure shown in Figures 7 and 8;

Figure 12 is a schematic view showing another manner of coupling parts of the vehicle together.

Referring more particularly to the drawings, the numeral 10 designates the foot-propelled dirigible front wheel of my combination child's vehicle, said wheel being rotatably mounted as at 11 between the tines of fork or bifurcated member 12. The upper end of the fork is rotatably mounted as at 13 in the front portion of an elongated straddle bar 14, which bar extends rearwardly and downwardly and has near its trailing end a downwardly extending leg 15. Leg 15 is adjustably mounted in slot 16 of column 17 by means of slots 15a and bolts 18 whereby the trailing end of bar 14 can be raised or lowered to thereby vary the slant of the bar (see Figures 1 and 4). The lower end of column 17 is secured to the central portion of transversely extending rear axle frame 19 by means of bolts 20. Mounted in frame 19 is rear axle 21 having spaced rear wheels 22 on the ends thereof.

Thus, the front and rear wheels are coupled by an arched frame consisting of the lower portion of vertically disposed fork member 11, the intermediate portion of elongated straddle bar 14, and the vertically extending leg and column members 15 and 17. In other words, that portion of the frame disposed between the front and rear wheels is an inverted U-shaped structure designed to provide optimum ground clearance.

The three-wheeled vehicle as above described is adapted to be steered by suitable means such as handle bars 25 fixedly secured to the upper end of fork 12. The operator of the vehicle manipulates the handle bars 25 while occupying seat 26, which seat is adjustably secured to straddle beam 14. It is apparent from the drawings that by employing the slender elongated straddle bar 14 as a coupling member, substantially all of the mass of the vehicle will be concentrated respectively at the extremities of the latter. This feature, in combination with a center of gravity located to the rear of the operator's seat and the above-mentioned ground clearance structure, contribute to the improved weight distribution and balance, as well as to the resistance to overturning and grounding of the vehicle when operating on uneven terrain. The last-named adjustment means permits movement of seat 26 vertically, as well as longitudinally along the bar, and to a position satisfactory to the operator. Specifically, the vertical adjustment means comprises block 27 in which downwardly extending shaft 26a of seat 26 is adjustably secured by means such as set screw 28. The longitudinal adjustment is effected by means of slot 29 in straddle beam 14, which slot has block 27 adjustably mounted therein by means of set screw 30. Seat 26 overhangs straddle bar 14 so that the operator may ride with his legs astride the bar.

To the rear of the operator's seat 26 and on straddle bar 14 is mounted a scoop-shaped tandem seat 35 by suitable means such as set screws 36, said seat being adapted to carry either a passenger or cargo. Seat 35 has a flat rearwardly inclined bottom, and an open front side disposed adjacent the operator's seat 26. The open front of the seat overhangs each side of straddle bar 14 thereby permitting the occupant to sit with his legs astride the bar. The rearwardly inclined bottom causes the cargo to bounce deeper into the seat, rather than forward and out, when the vehicle vibrates.

Seat 35 is also provided with a suitable hand-hold or retention bar 37 which may be employed to give extra safety to very young passengers. The bar 37 is removably secured in the side walls of seat 35 by means such as wing nut 38 (see Figures 2 and 3).

It is to be understood that the straddle bar 14, as well as column members 15 and 17, may be constructed from any suitable material such as wood, metal tubing, or angle iron to accommodate the particular design required, and without departing from the spirit of this invention. Likewise, the seat 35 may be constructed of wood or metal as desired.

It is important to note that the bar 14, member 15, and column 17 form a substantially L-shaped elongated frame, so constructed and arranged that greater ground clearance is obtained between the front and rear wheels. Another important feature of this construction is the rearward and downward pitch of bar 14 and the seats 26 and 35 to thereby effect a low center of gravity of the assembly. The pitch of the bar should be such as to provide a satisfactory balance of requirements for both a low center of gravity and an adequate ground clearance. Preferably, the pitch of the bar should not be so great as to prevent the upper surface of the bar adjacent the seats from being employed to support objects or passengers, nor should it be so small as to result in an objectionably high center of gravity.

Briefly, the L-shaped frame has the following novelty features not previously utilized in tricycle-type toys:

(a) It affords improved weight distribution and balance, loaded or unloaded. The rearward declination of the main frame member or straddle bar 14 operates to lower the center of gravity. This feature coupled with the relatively wide rear wheel spacing reduces the effective overturning moment resulting from the action of centrifugal force while cornering, thus permitting safe negotiation of sharper turns at higher speeds than heretofore possible.

(b) The rearward declination of bar 14, which operates to lower the center of gravity and places it to the rear of the operator, permits safer operation on downhill slopes. Slopes having a decline less than that of the main frame member 14 are negotiated with less overturning moment than would be had with a vehicle with a conventional horizontal main frame.

(c) The long wheel base, combined with the location of seats 26 and 35 which places the center of gravity near the rear wheels, reduces the tendency of the vehicle to skid on turns. The wide spread of the rear wheels 22 provides a greater purchase on the supporting surface, and the skid-resisting moment is increased by the additional moment between the center of gravity of the rear wheel contact point. When operating on uneven ground, or while angling up or down an incline, conventional vehicles of this type are subject to overturning about an axis between the points of contact of the front wheel and the lowermost rear wheel. Because of the long wheel base, the wide spread of the rear wheels, and a center of gravity low and near the rear, the present embodiments of my improved vehicle are able to negotiate more severe conditions with less danger to this type of overturning.

(d) The long body 14 of the L-shaped frame gives the child operator a feeling of power in being able to operate an elongated vehicle with no more effort than is required to propel an ordinary tricycle. Yet the vehicle can make a 360 degree turn in its own length.

(e) The elevated tandem seat 35 makes it impossible for passengers to entangle their fingers in the rear wheels 22.

(f) The high L-shaped frame enables the vehicle to negotiate rough terrain, curbs, gutters and the like, without grounding in the middle. It can travel practically anywhere a man can walk.

Figure 6 is a slightly modified form of the invention in which the frame and seats are so positioned that all possible loads will be placed between the wheels. In this embodiment the portions 15 and 17 are inclined slightly forward of a vertical position in order that the points of contact of the rear wheels 22 with their supporting surface falls directly below or slightly to the rear of the rearmost portion of the rear seat 35. The upper portion of member 15 is connected to the end of bar 14, rather than at a short distance forwardly of the rear end as shown in the first embodiment. This arrangement prevents overturning by placing all possible loads between the wheels.

Figures 7, 8 and 9 show another modified form of the invention wherein means are provided for adjusting the length of the wheel base, and also means whereby the vehicle can be readily dismantled for crating and shipping purposes. In these figures, like reference characters will be applied to parts previously described, and additional reference characters will be applied to parts which have been added, or which are substantially different. It will be noted in this embodiment that the straddle bar and its rear end support are made of tube steel so as to facilitate telescopic adjustment, both as to length of wheel base and as to the inclination of the straddle bar.

The upper end of fork member 12 is rotatably mounted as at 41 in the front end of a straddle bar broadly designated by reference character 42. Bar 42 comprises T-shaped member 43, operator's seat support 44, and tandem seat support 45. Support 45 has a downwardly extending trailing end 46, which end is telescopically mounted in upwardly extending column 47 by means of bolts 48 which penetrate coinciding holes in members 46 and 47. Adjustment of the height of the rear end of the straddlebar 42 is effected by removing bolts 48 and then raising or lowering end 46 until other holes 49 coincide with the holes in column 47, after which the bolts are reinserted. The lower end of column 47 is secured to axle housing 50 in which rear axle 21 is mounted.

To effect an adjustment of the length of the wheel base ends 54 and 55 of seat support 44 are provided with holes 56, and the adjacent ends of members 43 and 45 are provided with holes 57 and 58 having the same spacing. The ends 54 and 55 are telescopically connected to the proximate ends of members 43 and 45 respectively, and are held in fixed position by bolts 59 and 60 which pentrate coinciding holes in the telescoped ends. In order to adjust the length of the straddle bar, the holes 56 in the ends of the seat support 44 can be made to coincide with other holes 57 or 58 in the ends of members 43 or 45, and then bolts 59 and 60 inserted to effect a rigid connection.

Figures 10 and 11 show a vehicle equipped with an operator's seat and a plurality of tandem seats. This construction affords means for varying the length of the wheel base, as well as means for varying the passenger or cargo carrying capacity. The spare seat is indicated by reference character 62, said seat being secured to bar 63 as at 36 and having a restricted end 64 and an open end 65. Ends 64 and 65 have holes 67 and 68 respectively therein, which holes have the same spacing as holes 56, 57 and 58 in members 43, 44 and 45 respectively (see Figures 7 and 8). From the above description it is apparent that bolts 60 in Figures 7 and 8 may be removed so as to separate the members 44 and 45. The seat 62 is then positioned with its end 64 inserted into end 55 of the seat support, and also with its end 64 slidably fitting over the proximate restricted end of tandem seat support 45, after which bolts 60 are inserted in coinciding holes of the connected members to secure the spare tandem seat in position.

By employing a similar operation the seat 62 may be inserted between members 43 and 44, rather than in the position just described.

It is further noted (see Figure 12) that this sectional construction of the straddle bar permits the portion 43 to be connected directly to portion 45, omitting seats 26 and 62 and their associated supports, thus providing a one-seat vehicle wherein seat 35 with its inclined bottom serves as an operator's seat and space for cargo.

In the drawings and specification preferred embodiments of the invention have been shown, and although specific terms have been employed they are not intended for purposes of limitation, the scope of the invention being set forth in the following claims.

I claim:
1. In a child's vehicle having a front wheel and a pair of relatively small spaced rear wheels of the same diameter, a coupling means between said front and rear wheels for providing increased ground clearance and resistance to overturning comprising, a vertically disposed fork member having downwardly extending prongs straddling said front wheel, the lower ends of said prongs being supported at the axis of rotation of the front wheel, means including said fork for guiding said front wheel, an upwardly extending column having its lower end supported by said rear wheels, a substantially straight elongated straddle bar having an upper surface adapted to support seated passengers, said bar rotatably connected to said fork member at a point above and adjacent the front wheel and rigidly connected to the upper portion of said column, an operator's seat positioned on said bar adjacent said front wheel guiding means, and a forwardly-facing scoop-shaped tandem seat mounted on said bar above said column and having its forward edge overhanging each side of the bar, whereby substantially the entire weight of the vehicle will be concentrated at the respective ends of the straddle bar and whereby the connected fork member, bar and column provide complete clearance between the front and rear wheels; the foregoing members being constructed and arranged about a center of gravity located rearwardly of the operator's seat and near said rear wheels; the upper surface of said bar and the bottom of said tandem seat lying in a common plane gently inclined downwardly and rearwardly at an angle with the ground level adapted for seating passengers, said angle being less than the angle formed between the ground level and a plane tangent to the upper peripheries of the front and rear wheels, whereby said center of gravity will be lowered while maintaining said complete ground clearance.

2. A child's vehicle as defined in claim 1 wherein said column comprises a pair of telescoped members, and further comprising means for adjusting said members in fixed positions relative to one another, whereby the inclination of said bar and passenger seating surfaces on the bar and tandem seat may be varied simultaneously with the variation of the height of the center of gravity of the vehicle.

References Cited in the file of this patent

UNITED STATES PATENTS

| | | |
|---|---|---|
| D. 176,584 | Barone et al. | Jan. 10, 1956 |
| D. 178,978 | Wintermantel | Oct. 16, 1956 |
| 1,279,540 | Hams | Sept. 24, 1918 |
| 1,309,331 | Nelson | July 8, 1919 |
| 1,492,440 | Firehammer | Apr. 29, 1924 |
| 1,498,922 | Lehman | June 24, 1924 |
| 1,748,566 | Furman | Feb. 25, 1930 |
| 2,565,848 | Howard | Aug. 28, 1951 |
| 2,616,734 | Olson | Nov. 4, 1952 |
| 2,817,539 | Stevens | Dec. 24, 1957 |